United States Patent
Arditti Modiano et al.

(10) Patent No.: US 7,673,144 B2
(45) Date of Patent: Mar. 2, 2010

(54) CRYPTOGRAPHIC SYSTEM FOR GROUP SIGNATURE

(75) Inventors: David Arditti Modiano, Clamart (FR); Sébastien Canard, Caen (FR); Marc Girault, Caent (FR); Jacques Traore, Flers (FR)

(73) Assignee: France Telecom, Paris (FR)

( * ) Notice: Subject to any disclaimer, the term of this patent is extended or adjusted under 35 U.S.C. 154(b) by 812 days.

(21) Appl. No.: 10/500,311

(22) PCT Filed: Dec. 20, 2002

(86) PCT No.: PCT/FR02/04502

§ 371 (c)(1),
(2), (4) Date: Jun. 28, 2004

(87) PCT Pub. No.: WO03/056750

PCT Pub. Date: Jul. 10, 2003

(65) Prior Publication Data

US 2005/0081038 A1    Apr. 14, 2005

(30) Foreign Application Priority Data

Dec. 27, 2001    (FR) .................................. 01 16950

(51) Int. Cl.
*H04L 9/00* (2006.01)
(52) U.S. Cl. .................. 713/176; 713/180; 713/177
(58) Field of Classification Search .................. 713/176
See application file for complete search history.

(56) References Cited

U.S. PATENT DOCUMENTS

| | | | | |
|---|---|---|---|---|
| 6,161,183 | A * | 12/2000 | Saito et al. | 713/176 |
| 6,411,716 | B1 * | 6/2002 | Brickell | 380/286 |
| 6,530,020 | B1 * | 3/2003 | Aoki | 713/163 |
| 6,986,044 | B1 * | 1/2006 | Inada | 713/170 |
| 7,093,133 | B2 * | 8/2006 | Hopkins et al. | 713/176 |
| 2005/0039018 | A1 * | 2/2005 | Wittkotter | 713/176 |
| 2005/0204129 | A1 * | 9/2005 | Sudia et al. | 713/158 |

OTHER PUBLICATIONS

XP-000900793, Apr. 1991, Amesterdam, David Chaum.*
Camenisch J et al., "Efficient Group Signature Schemes for Large Groups" Advances in Cryptology—Crypto 97. Santa Barbara, Aug. 17-21, 1997, Proceedings of the Annual International Cryptology Conference (CRYPTO), Berlin, Springer, DE, Aug. 17, 1997, pp. 410-424, XP000767547.
Ateniese G. et al. "A Practical and Provably Secure Coalition-Resistant Group Signature Scheme" Aug. 20, 2000, pp. 255-270, XP001003407.
Chaum D., "Group Signatures" Apr. 1991, pp. 257-265 XP000900793.
Bonetti P. et al., "The Italian Academic Community's Electronic Voting System", Computer Networks, vol. 34, No. 6, Dec. 2000, pp. 851-860, XP004304824.

* cited by examiner

*Primary Examiner*—Nasser G Moazzami
*Assistant Examiner*—Fikremariam Yalew
(74) *Attorney, Agent, or Firm*—Miles & Stockbridge P.C.; Eric G. King (57) ABSTRACT

The invention concerns a system enabling a member (M) of a group (G) to produce, by means of customized data (z; K), a message (m) accompanied by a signature (8) proving to a verifier that the message originates from a member of the group (G). The invention is characterized in that the customized data is in the form of an electronic physical medium (26). Advantageously, the latter also incorporates: encrypting means (B3) for producing a customized cipher (C) from the customized data prior to the signature S of the message (m), means (B5) for producing a combination of a message m to be signed and the cipher (C) associated with said message, for example in the form of a concatenation of the message (m) with the cipher (C), and means (B6) for signing (Sig) the message (m) with the customized data (z; K) in the form of a cipher (C) associated with said message. Advantageously, the physical medium is a smart card (26) or the like.

17 Claims, 5 Drawing Sheets

CRYPTOGRAPHIC SYSTEM FOR GROUP SIGNATURE

This invention relates to the technical domain of security of services, and more precisely security of electronic message signatures using cryptography.

Remember that an electronic signature is a mechanism based on so-called public key cryptography; the signatory has a secret key and an associated public key. He produces the signature of a message using his secret key. The checker only needs the public key to check the signature.

More precisely, the invention relates to electronic group signatures. A group signature enables members of the group to produce a signature such that the checker will recognize this signature as being produced by a member of the group, without knowing which member. However, a trusted authority can eliminate this anonymity at any time and therefore reveal the identity of the signatory. This type of signature is often called "non-correlatable"; it is impossible to determine whether or not two signatures were issued by the same person.

In any conventional group signature scheme, the group is assigned a unique group public key, while each member of this group is assigned an identifier and a private key that are specific to him. A member of the group can use his private key to produce a group signature for a message of his choice, and any entity can check this signature using the group's public key. This check on the signature informs this entity only that the signature was produced by a member of the group, but does not give any information about the identification of the member who signed. On the other hand, the trusted authority has additional information so that it can find the identifier of this member, and therefore eliminate this anonymity at any time (it is said that the trusted authority "opens" the signature).

Group signatures have many applications, including the following two.

Figure 1:
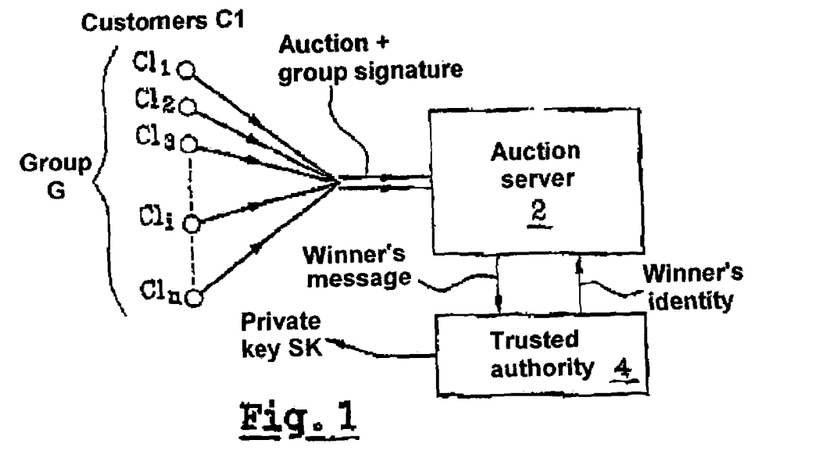
FIG. 1, already described, is a principle diagram illustrating an example of group coding in the context of an auction.

A first application described with reference to FIG. 1 is electronic auctions. It sets up three parties: an auction server 2, a trusted authority 4 and a customer C1. All customers form a group G called the "customers group". A user who wants to enter the customers group G must contact the trusted authority 4, who provides him with his private key SK. He thus obtains the right to produce a group signature. With this right, he can sign each of his auctions anonymously. When making a bid for a particular product, each member of the customers group can increase the bid by signing a message containing particularly the product for sale and the amount of his bid. The auction server 2 can check that he belongs to the group and therefore that the bid is valid simply by checking the group signature. The winner is the person who makes the highest bid before the award. Therefore the last message received by the bids server is the winner's message. The server then addresses this message and the corresponding group signature to the trusted authority 4, which is alone capable of eliminating the anonymity and therefore determining the physical identity of the buyer of the product put up for auction.

Bids must be made quickly. They take place during a very short time in which the first bidder who bids at a given price has a good chance of wining the bid because he has reached a level that is too high for the others. This is why his bid signature mechanism must not take too much time.

Figure 2:
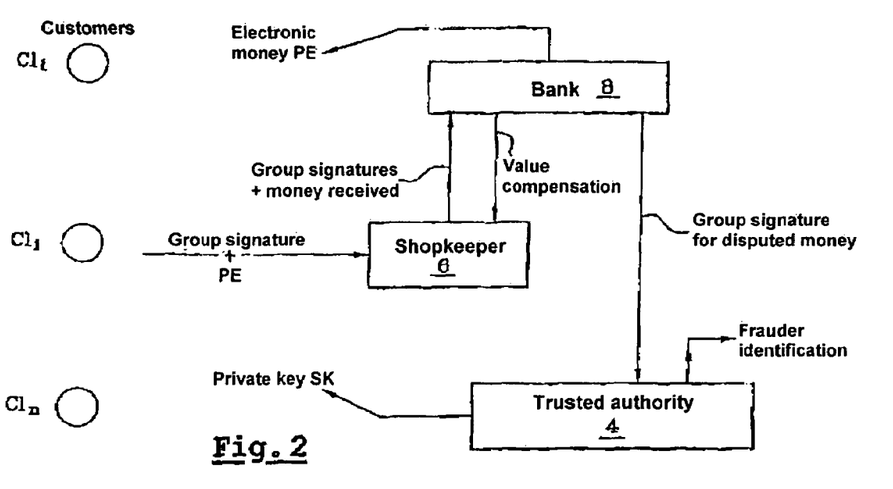
FIG. 2, already described, is a principle diagram illustrating example of group coding in the context of purchases by electronic money.

Another application described with reference to FIG. 2 is anonymous electronic payment. It sets up four parties, namely a customer C1, a shopkeeper 6, a bank 8 and a trusted authority 4. Each customer C1 must be registered in the system and obtain a private key SK of a group signature scheme before he can perform his first transaction. In order to make the payment, the customer must withdraw electronic money PE from his bank 8. Remember that electronic money represents data (a serial number) digitally signed by the bank. The electronic money PE that he withdraws is anonymous due to the use of a so-called blind signature mechanism.

Electronic money PE is spent with a shopkeeper 6 as follows: the customer (Cli in the example) generates a group signature related to the electronic money PE and transmits the assembly (signature and PE) to the shopkeeper. If the money is valid (check on the bank signature) and the group signature is authentic, the shopkeeper accepts the transaction. At the end of the day (or at the most appropriate moment), the shopkeeper sends signatures to the bank with the money received for payment so that the bank can compensate their value. In case of fraud (for example if the same money is used in several transactions), the bank 8 sends the group signature appearing on the disputed money to the trusted authority 4 for it to identify the fraudulent customer and to apply an appropriate sanction.

There are many articles containing proposals for group signature schemes. Two of them are mentioned most frequently at the moment: i) J. Camenisch, M. Stadler "Efficient group signature scheme for large groups" In B. Kaliski, Advances in Cryptology; Eurocrypt '97, vol. 1294 by LNCS, pages 410-424. Springer Verlag, 1997, and ii) G. Ateniese, J. Camenisch, M. Joye, G. Tsudik "A practical and provably secure coalition-resistant group signature scheme" In M. Bellare Advances in Cryptology—CRYPTO 2000, vol. 1880 by LNCS, pages 225-270. Springer Verlag.

They are all based on the same general concept, which is as follows.

Firstly, they consider an ordinary signature scheme, for example according to the RSA (Rivest, Shamir, Adleman) algorithm, which is a probabilistic encryption scheme (if the same message is encrypted twice, the corresponding encrypted texts are different) and semantically secure (it is impossible to learn any information about the plain text from the encrypted text).

A trusted authority 4 responsible for the group G then generates encryption and signature keys, and then puts the corresponding public keys in a generally accessible location, for example in a directory. It keeps the associated private keys SK secret.

If a person wants to become a member of the group, he determines an identifier (numeric value that the trusted authority can relate to the person or legal entity belonging to the group) and interacts with the trusted authority 4 to obtain a member certificate that is actually the signature of the identifier using the private signature key SK of the trusted authority.

The member concerned performs two actions to sign a message m on behalf of the group:

action i): he encrypts his identifier using the public encryption key of the trusted authority (this part will be used to open the signature) and action ii): he demonstrates that he knows a member certificate associated with the plain text included in the encrypted text (proof that he actually forms part of the group).

In this text, we will consider cryptography, and more particularly proof of knowledge to obtain the required properties on group signatures.

The check of the signature consists of checking the proof of knowledge, for example of the zero knowledge type. Opening the signature is simply decryption of the identifier.

A major disadvantage of this principle is the volume of the calculations. Each signature requires an encryption (action i) and particularly a number of proofs of knowledge (action ii) that in practice are very expensive in calculation time, since they involve a large number of modular exponentiations (for example, each modular exponentiation takes about one second on a smart card on which a cryptoprocessor is installed).

Having seen the above, the purpose of this invention is to set up a group signature scheme that is very fast, in other words that requires very little modular exponentiation (typically a maximum of 1 or 2 exponentiations in the examples), while keeping the properties of existing group signature schemes (constant signature size, secure scheme, public key unchanged when a new member arrives, etc.).

Industrially, it thus enables fast implementation even when using calculation supports with a small capacity, such as smart cards and similar portable communication devices.

More particularly, a first purpose of the invention is a group signature system by which a group member can use personalized data to produce a message accompanied by a signature proving to a checker that the message originates from a group member, characterized in that the personalized data is in a form integrated into an electronic hardware support.

In one preferred embodiment, the electronic hardware support also integrates encryption means to make personalized encryption starting from the said personalized data before the message signature, means of making a combination of a message to be signed and the encrypted text associated with this message, for example by concatenation of the message with the encrypted text, and means of signing the message with the personalized data in encrypted form associated with this message.

The personalized data may be an identifier personal to the member, the electronic hardware support also including an encryption key common to all group members, and encryption means encrypting the identifier with this encryption key.

Preferably, the encryption means encrypt an identifier and a random number.

As a variant, the personalized data may be a diversified encryption key specific to each group member, the encryption means making an encrypted text using at least one data, for example a random number, with the encryption key.

The encryption means can use an encryption algorithm with a secret key, for example the algorithm known as AES (advanced encryption standard), or a public key encryption algorithm, for example the algorithm known as RSA (Rivest, Shamir, Adleman).

Advantageously, the signature means use a private key signature algorithm, for example the algorithm known as RSA, which can include the so-called PKCS#1 standard as defined particularly in the document "RSA Cryptography Standard—RSA Laboratories—Draft2—Jan. 5, 2001".

Advantageously, the electronic hardware support is portable communicating device, particularly a smart card.

According to a second aspect, the invention also relates to a method for sending a message with a group signature of this message, characterized in that it uses the first aspect of the system, the message signature being produced with a private key SK common to group members and integrating the personalized data produced from the electronic hardware support, the method including transmission of the message thus signed to a checker without needing to supply proof to the checker that the member belongs to the said group, such as a member certificate or proof of possession of such a certificate.

According to a third aspect, the invention relates to a method for checking a message received with a group signature of this message, the message having been sent in accordance with the method according to the second aspect, characterized in that the check is made using a public key corresponding to the said private key.

According to a fourth aspect, the invention relates to a method for opening a signature produced by the system according to the first aspect, characterized in that it comprises steps consisting of:
    making correspondence data between identities of group members and their personalized data available before the signature;
    decrypting the personalized data received from an electronic hardware support for which the signature is to be opened; and
    making the decrypted personalized data correspond to the identity of the group member.

According to a fifth aspect, the invention relates to a method for preparation of an electronic hardware support for the system according to the first aspect, personalized to a member accepted into a group, characterized in that it comprises steps consisting of:
    producing the personalized data to be used for the said electronic hardware support to be personalized; and
    registering this personalized data with a private signature key in the support.

The invention and the resulting advantages will appear more clearly after reading the following description of preferred embodiments, given purely as non-limitative examples, with reference to the attached drawings among which.

According to the invention, rather than considering the two actions i) and ii) mentioned above according to the state of the art, an approach is planned according to which the identifier is no longer directly associated with a person or a legal entity, but is integrated into a communicating electronic device assigned to an authorized member of the group. In this embodiment, the device, which is typically portable such as a smart card or a housing containing a smart card (for example a mobile telephone terminal), advantageously includes the following items on the same physical assembly: personalized data (identifier or diversified encryption key) memorized in electronic form, means of encrypting this data, and means of making the group signature on the assembly including the message to be transmitted and the encrypted personalized data text.

Figure 3:
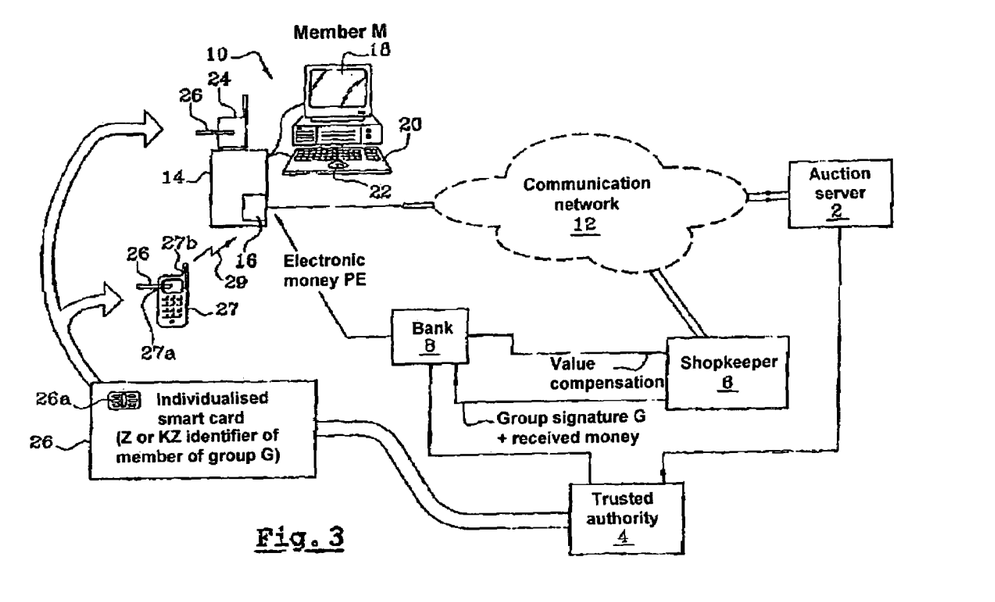
FIG. 3 is a diagram used to illustrate transactions using a smart card for the signature of messages in accordance with the invention.

FIG. 3 shows an example embodiment of the invention for the case of a member M of a group G who uses a personalized smart card 26 to perform transactions with service providers, in fact a bids server 2 and a shopkeeper 6. The communication between a member M and a service provider may be made by any known means, for example from his personal computer (PC) 10 through a communication network such as Internet, or by a mobile telephone 27 equipped with an external smart card reader 27a, a data exchange with service providers 2, 6 being then made by radio means 29 through the antenna 27b of the mobile telephone.

The personal computer 10 comprises particularly a system unit 14, a modem card 16 or other communication interface with the network 12, a display screen 18 and a keyboard 20 with a pointing device 22. It also includes a smart card reader 24 in which the smart card 26 can communicate with its system unit 14 and on the network 12. The chip part 26a of the card is preferably of the secured type.

Services offered by the bids server 2 and the shopkeeper 6 are identical to services described in the context of FIGS. 1 and 2 respectively, and will not be described again for reasons of conciseness. Similarly, their method of operation with the bank 8 (for the shopkeeper 6) and the trusted authority 4 is approximately the same.

According to the invention, the trusted authority 4 issues an identifier z to a member M of the group G, accepted by the trusted authority, directly in hardware form, in the event in the form of a personalized smart card 26 personalized with a secured chip 26a.

The personal data is registered in a card (in the form of an identifier z or a diversified key K denoted Kz) by a data exchange protocol using a terminal managed by the trusted authority. The personalized data is produced and stored within the card during this exchange.

The trusted authority 4 may also establish the personalized data with an existing smart card provided that this card is capable of enabling data to be loaded after it has been issued. In particular, this is the case with versatile cards designed to accept new applications at any time by downloading from a terminal, capable of combining several distinct services or functions on the same support.

Therefore, the trusted authority associates a member (person or legal entity, generically denoted as a "person") of the group G to his personalized data by means of the personalized card 26 issued for this person. Therefore, this person does not need to record his personalized data himself and provide cryptographic proof that he possesses it.

A personalized card 26 is issued to a candidate by the trusted authority 4 when this person satisfies the conditions to become member of the group G, with the normal verifications and precautions, in the same way as when a conventional bank card is issued. In particular, the trusted authority records the correspondence between the personalized data contained in an issued card 26 and the identity (for example the name) of the person to whom this card was returned.

As a result, in this case security is based firstly on a device containing a secured chip 26a, and secondly on a key. This key can either be shared by all members M of the group G to generate a group signature when the personalized data is an identifier to be encrypted by this key, or it may be diversified, in other words specific to the member when it forms the personalized data in itself. The following description presents detailed aspects of this approach.

Firstly, embodiments of the invention make use of an ordinary signature scheme S and a probabilistic and semantically secure encryption algorithm (public key algorithm or secret key algorithm). The trusted authority 4 responsible for the group then generates the signature key(s) SK or similar keys, and then puts the corresponding public key in a directory. It keeps the private signature key secret, and then publishes all information necessary to use the encryption algorithm.

To become a member, a person obtains a smart card 26 from the trusted authority 4 containing firstly either an identifier z, or a diversified key K (the trusted authority memorizing the link between the smart card, the identifier z and the diversified key K, and the new member M, in memory), and secondly the private signature key SK. Therefore, the private signature key SK is actually a key shared between all members of the group G. The card also contains all information necessary for encryption using the algorithm supplied by the trusted authority. Provided with this set of elements integrated in the smart card 26, the member M can use the smart card to sign a message m on behalf of the group G, and this signature S can be opened by the trusted authority (and only by this authority) if it becomes necessary.

In order to sign a message m on behalf of the group, the member uses his smart card that will use the message m as input. The card will start by making an encryption specific to the member using the encryption algorithm of the trusted authority, and will then sign the message composed of at least the initial message m and the encrypted message obtained previously, this signature being produced using the shared private signature key that it has in memory. At the output, the smart card 26 sends the message, the encrypted text and the signature to the addressee 2, 6 (checker).

The check of the signature consists simply of checking the signature generated by the shared private key, using the corresponding public key. Opening of the signature by the trusted authority 4 consists of decrypting the personalized data and finding the correspondence with the identity of the owner of the smart card 26.

The result is very fast on the card, since there is only one encryption and one signature to be made (and therefore a maximum of two modular exponentiations) at the time of the signature S.

Unlike the state of the art related to group signatures in which the link between the identifier and the message have to be made by cryptographic mechanisms (proof of knowledge), the invention uses a hardware approach with security based on the security of an object, advantageously made secure, and in this case the smart card 26.

The operating principle of embodiments for the smart card is described in more detail with reference to the flowcharts in FIGS. 5 to 7. Firstly, the general architecture of a smart card that can be used in the context of the invention is described with reference to FIG. 4.

Figure 4:
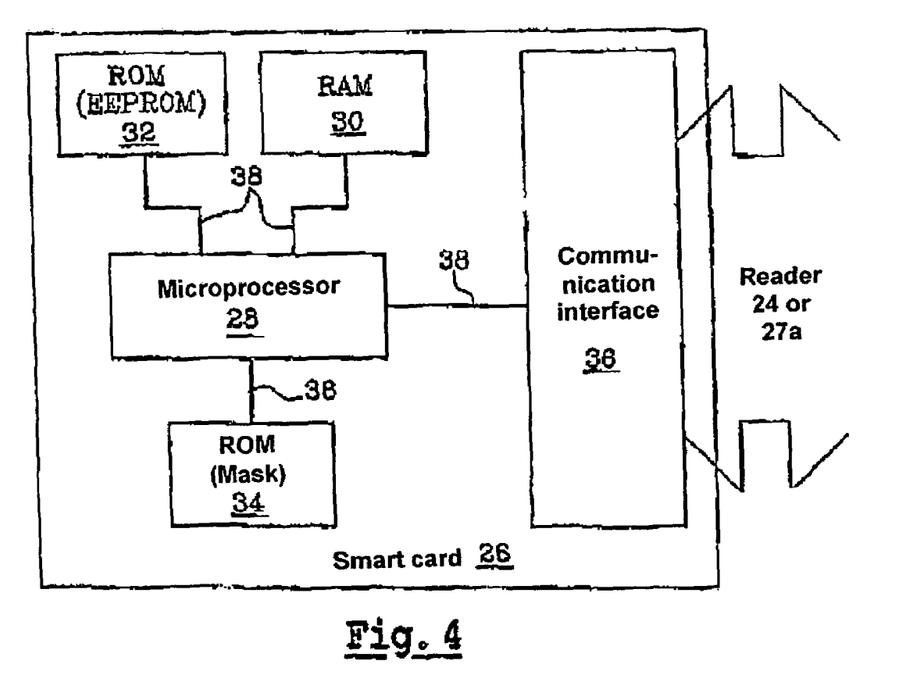
FIG. 4 is a block diagram of functional elements of a smart card that could be used to make group signatures in accordance with the invention.

FIG. 4 shows a simplified block diagram of the functional elements according to one possible architecture of the smart card 26. These elements include:

- a microprocessor 28 for management of the internal functions and execution of application programs of the card. In particular, it may include a "cryptoprocessor" optimized for cryptographic calculations;
- a random access memory (RAM) 30 accessible in write. This memory is used for several purposes including to record temporary data, for example intermediate results of algorithm calculations;
- a remanent memory 32 made using the electronically erasable programmable read only memory (EEPROM) technology. This memory is used particularly for long-term storage of data after the card has been manufactured, for example, the personalized data on the card, the software code related to the algorithms used, etc.;

a fixed memory 34 of the "mask" ROM type, programmed with unchangeable data during its manufacturing method using masks. In particular, this memory stores the card internal management code, and can also store encryption data common to group members. The designer chooses how to share data storage between the EEPROM memory 32 and the mask ROM memory 34;

a communication interface 36 through which the card exchanges data with the external environment, such as the card reader 24 or 27a; and an internal bus 38 that connects the above mentioned elements.

Figure 5:
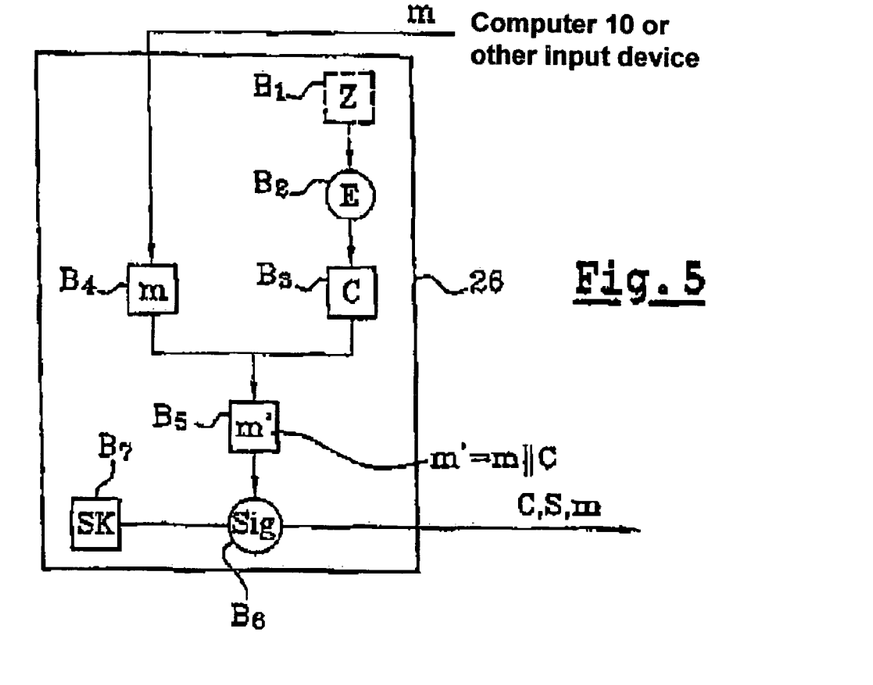
FIG. 5 is a general flowchart showing functional elements involved within a smart card to make group signatures in accordance with the invention.

The general operating principle of the card 26 for signing messages is shown in FIG. 5. This figure comprises a frame inside which all elements (data or actions) are located within the smart card, which is the reason for its name 26. In the case illustrated, the personalized data is in the form of an identifier z.

For each message m to be transmitted with the signature S of the group, the card 26 submits its own identifier z (box B1) to an encryption algorithm (generic designation E) (box B2). The box B1 is shown in dashed lines, since it is an element that can be eliminated if a diversified key Kz is used. Specifically, this action consists of making the microprocessor 28 execute the code of the algorithm E read from the EEPROM 32, and if necessary from the mask memory ROM 34, with insertion of the identifier z read internally from a memory on the card, for example the EEPROM memory 32, as a parameter. The algorithm E also uses at least one other parameter, such as a random number and an encryption key, as described later with reference to the examples. The result of the algorithm E on the identifier z is the encrypted form of the identifier, denoted C=E(z) (box B3). The encrypted text C is then stored temporarily internally in the memory 32.

At the same time, the card receives the message m to be signed on its communication interface 36 and temporarily records it in the RAM memory 32 (box B4).

The card then performs the concatenation m' of the message m and the encrypted text C (box B5), so that m'=m∥C. This operation consists of producing a binary sequence comprising the sequence of bits in message m followed/preceded by the bits of the encrypted text C.

The concatenation m' is then supplied as a parameter to another algorithm called the signature algorithm (generic designation Sig) (box B6) that produces the signature of m' using a private signature key SK. Specifically, this operation consists of making the microprocessor 28 execute the code of the Sig algorithm read from the EEPROM 32, and if applicable from the mask ROM 34, with insertion of part of the signature key SK as a parameter, read internally from a memory on the card, for example from the EEPROM memory 32, and secondly the concatenation m' read from the RAM memory 30.

The authenticated signature S of the message m thus produced by this algorithm Sig is then output to the communication interface 36 of the card 26 for use in the context of the transaction system of the group G. More particularly, the signature produced with the private signature key SK on the operand m', namely $Sig_{SK}(m')$, forms a set transmitted from the personal computer 10 or the mobile telephone 27 to a service provider 2 or 6.

These service providers, acting as "checkers", can determine if the message m extracted from the signature $Sig_{SK}(m')$ actually originates from an authentic card 26 using a verification algorithm (generic designation $Ver_{PK}(m',S)$ and a public key PK generally provided by the trusted authority 4. This algorithm is dichotomic, producing a yes or no answer.

In the trusted authority 4, the signature is opened using a decryption algorithm D to find the correspondence between the identifier z and the identity of the possessor of the smart card 26, namely z=D(C).

Table I summarizes the entities used by the different parties concerned in this general outline:

TABLE I list of entities used by a member M (card 26), a checker V and the trusted authority for the general embodiment.

| Elements used by Member M (card 26) | Elements used by Checker V (service provider 2, 6) |
|---|---|
| message m | public key PK |
| identifier z | $Ver_{PK}(m',S)$ = yes/no |
| private key SK | |
| C = E(z) | |
| m' = m∥C | |
| S = $Sig_{SK}(m')$ | |
| Elements used by the trusted authority 4 | |
| Z = D(C) | |

Figure 6:
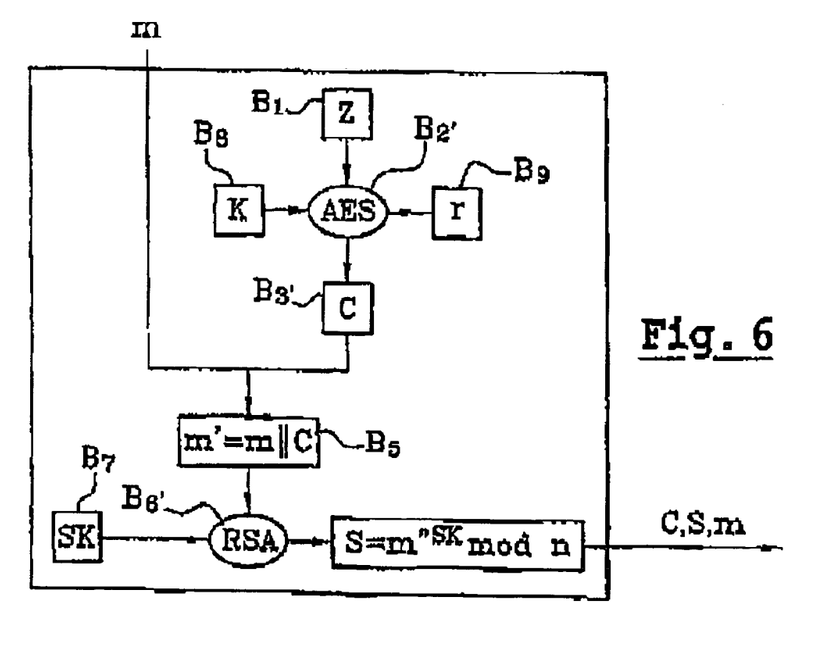
FIG. 6 is a flowchart of a first example embodiment of specific elements with regard to the flowchart in FIG. 5.
Figure 7:
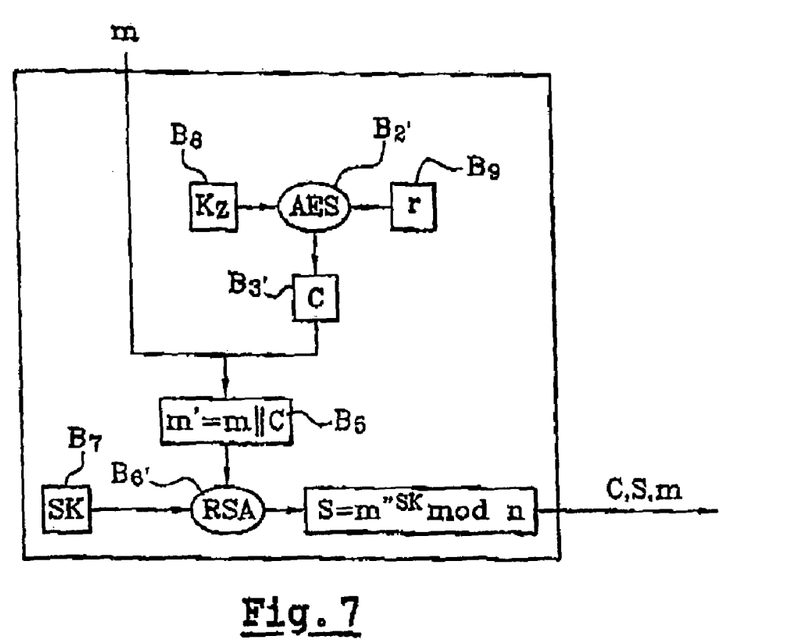
FIG. 7 is a flowchart according to a variant of the first example.
Figure 8:
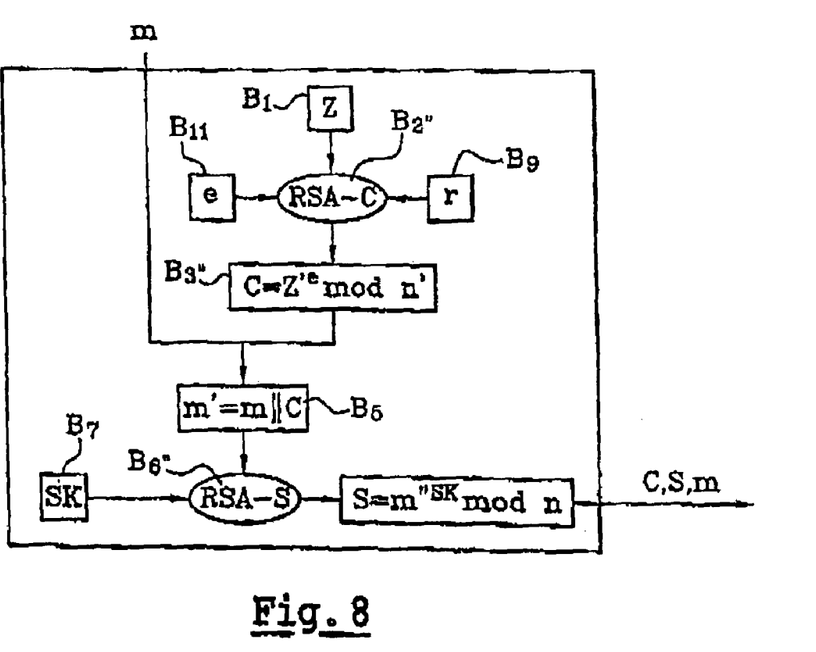
FIG. 8 is a flowchart of a second example embodiment of specific elements different from the flowchart in FIG. 5.

We will now describe two particular examples based on the general embodiment in FIG. 5, with reference to FIGS. 6 to 8 respectively. Each of these figures is a flowchart based on that shown in FIG. 5. The elements (boxes) in FIGS. 6 to 8 corresponding to those in FIG. 5 but in a specific form, are marked with the same references followed by a "'" (prime) sign for the case in FIG. 6 and a "''" (double prime) sign for the case in FIG. 7; identical elements in FIG. 5 and FIGS. 6 to 8 will have the same references. Aspects common to FIGS. 6 to 8 already described with reference to FIG. 5 will not be repeated for reasons of conciseness.

EXAMPLE 1

Embodiment Based on the AES Encryption Algorithm and the RSA Signature

In this example (FIG. 6), the selected signature scheme is the RSA algorithm. The module will be denoted n, the private key is SK and corresponds to the shared key; the public key is PK. The encryption algorithm chosen in the example is AES (Advanced Encryption Standard), which is therefore an algorithm with a secret key. The associated key is denoted K. In the case illustrated, it is a key shared among all members M of the group G. The trusted authority publishes PK and keeps all other keys secret.

In accordance with this first example, the EAS encryption algorithm B2' accepts the following input parameters: i) the identifier z (box B1), ii) a secret encryption key K (box B8) shared among all members M accepted in the group G and stored in the EEPROM memory 32, and iii) a random number r (box B9). This random number has a predetermined binary length, generated within the card 26 using a software code executed by the microprocessor 28. The random number r is renewed every time that the message m is signed.

The AES algorithm then produces the encrypted form C of the identifier and the random number r with AES and the secret key K (box B3').

This encrypted value C is then concatenated m'=∥C (box B5), and is then supplied as an input parameter to an RSA (Rivest, Shamir, Adleman) type signature algorithm (box B6'). This algorithm uses the private signature key SK as input (box B7) with which it produces the RSA signature of m", namely S=m"$^{SK}$ mod n, where m"=the result of PKCS#1 on m'; in which "mod n" means the arithmetic modulo n and PKCS#1 is a standard defined particularly in the document entitled "RSA Cryptography Standard—RSA Laboratories. Draft 2—Jan. 5, 2001".

Table II summarizes the entities used by the different parties concerned in the group G according to the first example:

TABLE II list of elements used by a member M (card 26), a checker V and the trusted authority according to example 1

| Elements used by Member M (card 26) | Elements used by Checker V (service provider 2, 6) |
|---|---|
| message m | public key PK |
| identifier z | m" = S$^{PK}$ mod n? |
| private key SK | |
| random number r | |
| C = AES (z,K,r) | |
| m' = m‖C | |
| m" = PKCS#1 (m') | |
| S = M"$^{SK}$ mod n | |
| Elements used by the trusted authority 4 | |
| z = AES (C,K) | |
| z <-> M | |

An additional security consists of splitting the trusted authority into two. The first part has the private key SK only (and no knowledge of member identifiers): this is the group authority (which is involved during the group registration phase). The second only has the key K and all identifiers of group members: this is the opening authority (which is involved during the signature opening phase). Thus, no one authority alone can substitute for one of the members. This approach is based on the principle that it is preferable not to trust the entire security of the system to a single authority.

When a new member arrives in the group, the trusted authority creates a new smart card for him and places SK and K and a value z (the member's identifier) in its memory n. It notes that the value z is associated with this new member, in its database.

When this member wants to sign a message, he inserts his card in a reader and asks it to sign the message m. Initially, the smart card uses the AES algorithm using the K key, the value z and a random number r as input data (the encryption is thus probabilistic) to obtain the encrypted text C at the output. It then creates the message m' by concatenating the message m and the encrypted text C that it has just obtained, and then modifies the result into a message m", for example according to standard PKCS#1. Finally, it calculates S=m"$^{SK}$ modn. The pair (S, C) is the group signature of the message m.

The checker only needs n and PK to check that the signature actually originates from a group member. All that he needs to do is to check that S=m"$^{SK}$ modn in accordance with the standard defined above. Moreover, since he cannot decrypt C (he does not have the K key), he has no means of knowing which member he is dealing with.

If the trusted authority wants to open the signature, it will only need to use the AES algorithm and the K key (it does not need to know the random number r for decryption) to obtain z, and then lookup in its database to see who corresponds to z.

One variant increasing the security level consists of choosing the diversified encryption key Kz according to the identifier, and only encrypting the random number r, in other words assigning a different key Kz for each member M of the group G.

In this variant, shown in FIG. 7, the identifier z is no longer used as such, since it is no longer necessary to individualize the card 26: instead, individualization is obtained directly by the diversified encryption Kz (box B8) since it is individual.

In terms of hardware, this variant is used in a manner similar to the first example, but by inputting only the random number r as a parameter into the encryption algorithm (which could still be the AES algorithm), and this random number is loaded as described above (box B9), the box B1 naturally being eliminated. The resulting encrypted text C is then processed in the same way (box B3' and subsequent boxes). Note that the random number r integrated into the encrypted text performs the same function of decorrelating the message m from its signature.

Thus, if a smart card is corrupted, the frauder will only be able to access the diversified key Kz of this card, and therefore will not be able to produce a group signature on behalf of an identifier other than the identifier contained in this card. The opening phase then consists of testing all existing encryption keys until the right key is found.

EXAMPLE 2

Embodiment Based on the RSA Encryption Algorithm and the RSA Signature

This example (FIG. 8) is similar to the first example (FIG. 6 or 7) and only the differences from the first example will be described.

The chosen signature scheme is once again the RSA algorithm. The module will be noted n, the secret key is SK and corresponds to the shared key; the public key is PK. This time the encryption algorithm is asymmetric since it is the cryptosystem RSA as described in the above mentioned standard. The module will be denoted n'. The public encryption key is e and the associated private key is d.

When a new member M arrives in the group G, the trusted authority produces a new smart card 26 or loads data into an existent card and puts n, n', e and SK into memory, together with a value z (the identifier of the member). It makes a note in its database that the value z is associated with this new member.

When this member wants to sign a message, he inserts his card 26 in a reader 24 or 27a and asks it to sign the message m. Initially, the card will encrypt its identifier z using an RSA cryptosystem (box B2"). To achieve this, it modifies the value z, for example according to the above-mentioned standard to obtain the value z' (this modification uses z and a random number r as input parameters (box B9)). It then generates C=z'$^e$ modn', which is the encrypted value of the identifier based on the public key e (box B11). It then makes the message m' by concatenating the message m and C that it has just obtained (box B5), and then modifies the result into a message m", for example using the above mentioned PKCS#L standard. Finally, it calculates S=m"$^{SK}$ modn (box B6") based on the private signature key SK. The pair (S, C) is the group signature of the message m.

Table III summarizes the entities used by the different parties concerned in the group G according to the first example.

TABLE III list of elements used by a member M (card 26), a checker V and the trusted authority according to example 2

| Elements used by Member M (card 26) | Elements used by Checker V (service provider 2, 6) |
|---|---|
| message m | public key PK |
| identifier z | m" = $S^{PK}$ mod n? |
| private key SK | |
| random number r | |
| z,r => z' (see PKCS#1) | |
| C = $z'^e$ mod n' | |
| m' = m∥C | |
| m' => m" (see PKCS#1) | |
| S = $M''^{SK}$ mod n | |
| Elements used by the trusted authority 4 | |
| z = $c^d$ mod n' | |
| z' => z (see PKCS#1) | |
| z <-> M | |

The checker 2, 6 only needs the value n and PK to check that the signature actually originates from a group member. He only needs to check that m"=SPK mod n (see the above mentioned PKCS#1 standard). Moreover, since he cannot decrypt C (he does not have the key K), he has no means of knowing which member he is dealing with.

If the trusted authority 4 wants to open the signature, it calculates $C^d$ mod p to find z', and then z (the transformation between z and z' does not require knowledge of the random number r and is fully described by the above mentioned standard).

Obviously, the second example also enables splitting the authority into two as described in the context of the first example. Similarly, in this second example it would also be possible to use a diversified key as personalized data, and to eliminate the identifier z, as in the variant of example 1 (see FIG. 7).

It will be understood from the above that the invention has a remarkable advantage in terms of calculation costs, since all that is necessary at the card 26 is an encryption algorithm and a signature algorithm, which together only require two modular exponentiations.

The invention enables a large number of variants for hardware, cryptographic, software means, for communication between parties concerned, and for applications.

Messages may be signed by any adapted device, non-necessarily making use of the smart card technology, for example such as specific portable objects, communicating personnel assistants, resources of a mobile telephone, etc.

Moreover, it would also be possible to envisage other algorithmic systems than those given in the examples (AES and RSA).

A member M and a service provider may also communicate through local, wired, radio, infrared or other links.

Finally, the given applications (shopping with electronic money, auction sales) are simply examples of many other possible applications.

The invention claimed is:

1. A group signature device for providing a message (m) accompanied by a group signature (S), comprising:
    means for storing personalized data (z, Kz) identifying any one individual member (M) of a group (G), wherein said group signature device is associated to said one individual member (M) of the group (G);
    means for storing a predefined private signature key (SK) common to all members of the group (G);
    encryption means (B3) for producing a single encrypted text (C), intended to be associated with said message (m), using said personalized data (z, Kz) of said one individual member (M) only;
    signing means (B6) which enables said one individual member (M) to produce the group signature (S) on behalf of the group (G) using said stored predefined private signature key (SK) common to all group members, wherein only the message to be signed (m) and said single encrypted text (C) produced using the personalized data (z, Kz) of said one individual member (M) are used to produce said group signature (S); and
    means for outputting the message (m) and the group signature (S) to a checker, such that the checker, upon receiving the message accompanied by the group signature, is able to verify that the message (m) is associated with the group (U) based on the group signature (S), with the identity of the individual member (M) of the group (G) remaining anonymous to the checker.

2. A group signature device according to claim 1, further comprising:
    means (B5) for combining the message (m) to be signed and the encrypted text (C) in the form of a concatenation of the message (m) with the encrypted text (C).

3. A group signature device according to claim 1, wherein said personalized data is an identifier (z) personal to the individual member (M);
    said means for storing further includes an encryption key (K) common to all members of the group (G); and
    encryption means (B3) produces said encrypted text (C) using the identifier (z) and said encryption key (K).

4. A group signature device according to claim 3, in which encryption means (B3) produces said encrypted text (C) using the identifier (z) and a random number (r).

5. A group signature device according to claim 1, wherein said personalized data is a diversified encryption key (Kz) specific to each member (M) of the group (G); and
    encryption means (B3) produces said encrypted text (C) using at least one data and said diversified encryption key (Kz).

6. A group signature device according to claim 5, wherein said at least one data includes a random number (r).

7. A group signature device according to claim 1, wherein the encryption means (B3) uses a secret key encryption algorithm.

8. A group signature device according to claim 1, wherein the encryption means (B3) uses one of the Rivest, Shamir, Adleman (RSA) public key encryption algorithm or the Advanced Encryption Standard (AES) secret key encryption algorithm.

9. A group signature device according to claim 1, wherein the signing means (B6) uses a private key signature algorithm (SK).

10. A group signature device according to claim 9, in which the private key signature algorithm is of the Rivest, Shamir, Adleman (RSA) type.

11. A group signature device according to claim 1, in which said group signature device is a portable communicating device.

12. A group signature device according to claim 11, in which said portable communicating device is a smart card.

13. A method for secure communication of message (m) sent by any one individual member (M) of a group (G) using a group signature (S), storing, using a group signature device, personalized data (z, Kz) that identifies said one individual member (M) of the group (G); storing, using the group signature device, a predefined private signature key (SK) that is common to all members of the group (G); producing, by said one individual group member (M), the group signature(S) of the message (m) on behalf of the group (G) by singing, with said predefined private signature key (SK) common to all group members stored on said group signature device, a set including the message (m) and a single encrypted text (C) produced using a personalized data (z, Kz) of said one individual member (M0 only; and outputting the message (m) along with the group signature (S) to a checker, such that the checker, upon receiving the message accompanied by the group signature, is able to verify that the message (m) is associated with the group (G) based on the group signature (S), with the identity of the individual member (M) of the group (G) remaining anonymous to the checker.

14. The method according to claim 13, further comprising:
   verifying, by using a public key (PK) corresponding to said private signature key (SK), that the message (m) is associated with the group (G) based on the group signature (S), without identifying the individual member (M) of the group (G).

15. The method according to claim 13, further comprising the steps of:
   decrypting the encrypted text (C) thus obtaining the personalized data (z, Kz); and identifying the individual member (M) of the group (G) based on said personalized data (z, Kz).

16. The method of claim 15, further comprising:
   producing said predefined private signature key (SK) common to all members of group (G);
   producing personalized data (z, Kz) identifying the individual member (M) accepted into the group (G); and
   registering said personalized data (z, Kz) with the private signature key (SK) in an electronic device personalized to said individual member (M) of the group (G).

17. A group signature system associated to any one individual member (M) of a group (G) and configured for ensuring a secure communication of a message (m) sent by said one individual member (M) of the group (G) using a group signature (S), said group signature system comprising:
   an electronic device configured to store a personalized data (z, Kz) identifying said one individual member (M) of the group (G), to store a predefined private signature key (SK) that is common to all members of the group (G), to produce a single encrypted text (C) intended to be associated with said message (m) using said personalized data (z, Kz) of said one individual member (M), and to produce the group signature (S) with a private signature key (SK) common to all group members using the message (m) and said single encrypted text (C) produced using the personalized data (z, Kz) of said one individual member (M) only, and to output the message (m) and the group signature (S);
   a checker that receives the message (m) accompanied by the group signature (S) output from the electronic device, said checker being configured to verify that the message (m) is associated with the group (G) based on the group signature (S), the identity of the individual member (M) remaining anonymous to the checker; and
   a trusted authority configured to identify the individual member (M) of the group (G).

* * * * *

UNITED STATES PATENT AND TRADEMARK OFFICE
CERTIFICATE OF CORRECTION

PATENT NO. : 7,673,144 B2 Page 1 of 1
APPLICATION NO. : 10/500311
DATED : March 2, 2010
INVENTOR(S) : David Arditti Modiano et al.

It is certified that error appears in the above-identified patent and that said Letters Patent is hereby corrected as shown below:

Column 12 – Line 17, delete "(U)" and insert --(G)--.

Column 12 – Line 64, insert --said method comprising-- after "(S)".

Column 13 – Line 3, delete "singing" and insert --signing--.

Column 13 – Line 8, delete "(MO" and insert --(M)--.

Signed and Sealed this

Fifteenth Day of June, 2010

David J. Kappos
*Director of the United States Patent and Trademark Office*